Figure 1:
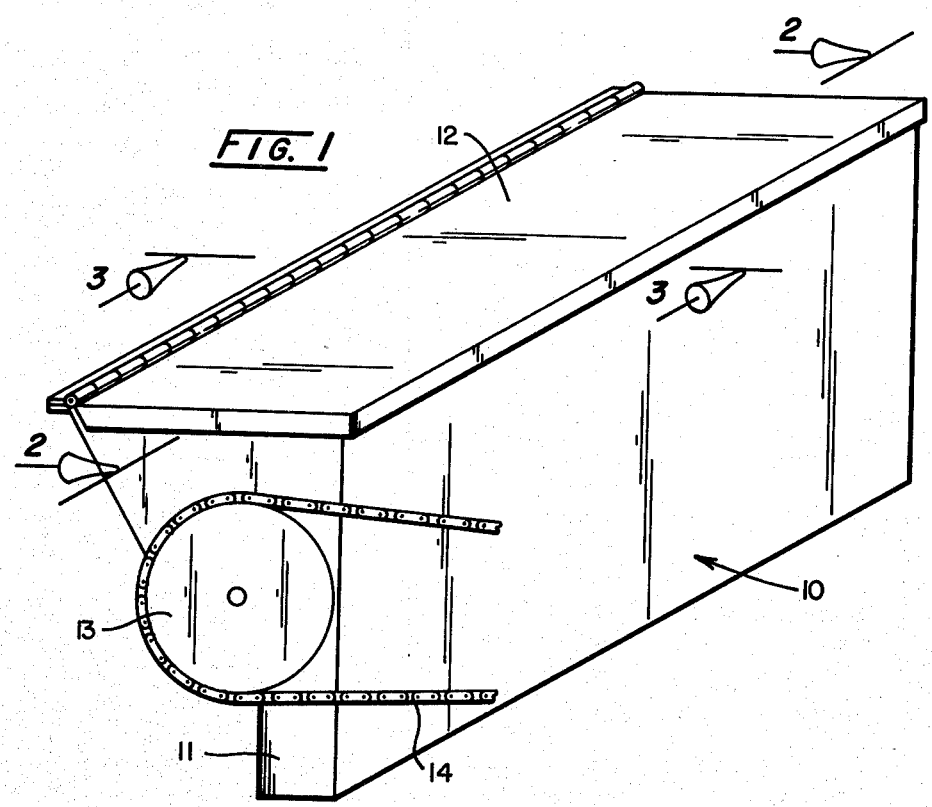
Figure 2:
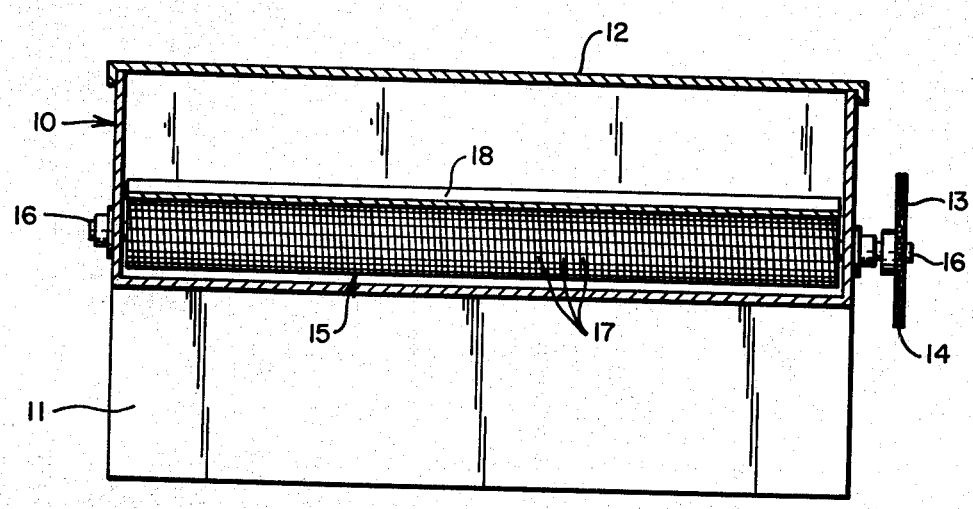

United States Patent [19]
Thatcher

[11] 4,267,946
[45] May 19, 1981

[54] PARTICULATE MATTER DISPENSING DEVICE

[76] Inventor: Gary G. Thatcher, Van Wert County, Ohio

[21] Appl. No.: 80,825

[22] Filed: Oct. 1, 1979

[51] Int. Cl.³ .............................................. G01F 11/10
[52] U.S. Cl. ................................. 222/345; 222/368; 29/121.3
[58] Field of Search ............... 222/371, 368, 350, 367, 222/345; 221/266; 198/850; 29/121.3

[56] References Cited

U.S. PATENT DOCUMENTS

| | | | |
|---|---|---|---|
| 97,938 | 12/1869 | Lowth | 222/350 |
| 2,684,788 | 7/1954 | Bland | 222/368 X |
| 2,870,739 | 1/1959 | Rodu | 222/368 X |
| 2,907,444 | 10/1959 | Smith | 222/368 X |
| 3,561,646 | 2/1971 | Meharry | 222/371 X |

Primary Examiner—Robert J. Spar
Assistant Examiner—Frederick R. Handren
Attorney, Agent, or Firm—John L. Gray

[57] ABSTRACT

An economical device for dispensing particulate matter uniformly across a surface which includes a rotating cylinder which has wrapped around the surface thereof in abutting fashion, a conventional small sprocket chain thus providing a series of small receptacles of uniform size which when filled with particulate material passes underneath a restrainer so that each container has a uniform quantity of particulate material therein and then as the cylinder rotates the particulate material is dispensed by gravity.

4 Claims, 4 Drawing Figures

U.S. Patent  May 19, 1981  Sheet 1 of 2  4,267,946

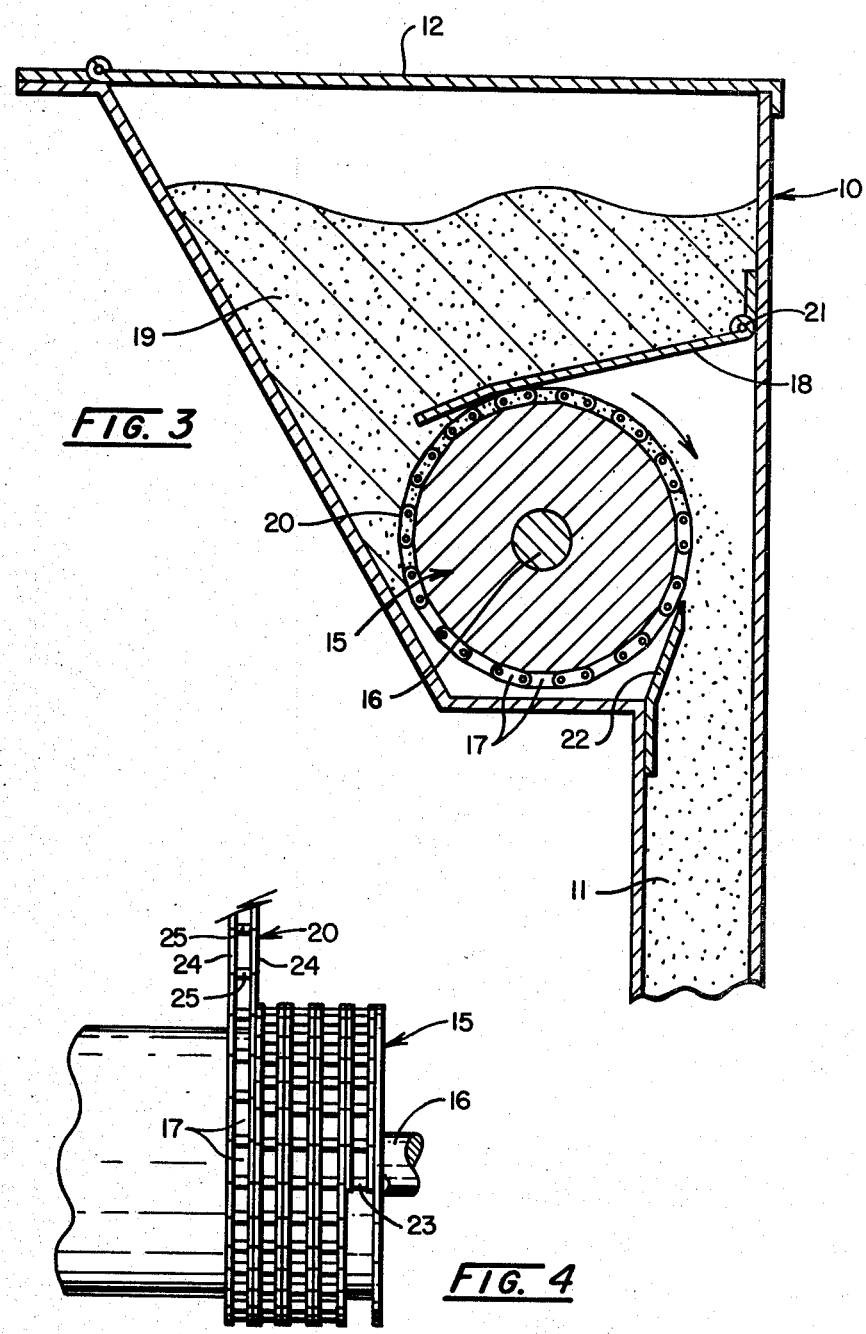

PARTICULATE MATTER DISPENSING DEVICE

SUMMARY OF THE INVENTION

In dispensing particulate matter uniformly, distribution of the particulate matter sometimes is difficult to achieve without expensive equipment. There are many industrial applications that require the application of particulate matter to a moving surface such as in the manufacture of abrasive coatings as well as in the baking industry and various other industrial applications.

The invention is also applicable to the portable application of particulate matter. An example of such an application is the dispensing of sand in conjunction with liquid asphalt sealing material in an asphalt sealing machine. While the invention may be used for this purpose, such as is disclosed in applicant's co-pending patent application, Ser. No. 080,825, "Asphalt Sealing Machine", and filed on Oct. 1, 1979, it is not so limited. While this invention is particularly well suited for dispensing fine particulate matter, it is not so limited. Medium and coarse particulate matter may also be distributed by use of this invention.

It is, therefore, an object of applicant's invention to provide a device for the uniform, even distribution of particulate matter.

Another object of this invention is to provide for the uniform distribution of particulate matter in an inexpensive, efficient fashion.

These, together with other objects and advantages, will become apparent in the details of construction and operation as more fully described hereinafter and claimed, references being had to the accompanying drawings forming a part hereof wherein like numerals refer to like parts throughout.

BRIEF DESCRIPTION OF THE DRAWINGS

FIG. 1 is a perspective view of applicant's invention.

FIG. 2 is a vertical elevation of applicant's invention on a section line 2—2 of FIG. 1.

FIG. 3 is side elevation sectional view of FIG. 1 on the section line 3—3 of FIG. 1.

FIG. 4 is a detailed plan view of a portion of the cylinder shown in FIG. 3.

DETAILED DESCRIPTION OF THE INVENTION

Referring now more particularly to the drawings and to FIG. 1, applicant's invention comprises a container 10 terminating in the lower portion with a shaft 11 extending the full length of the container 10. A hinged top 12 is also provided for loading the particulate matter into the container 10. The particulate dispensing device is rotatably driven by a sprocket 13 connected to a drive chain 14 from an appropriate power source (not shown).

Referring now more particularly to FIG. 2, it will be seen that the particulate matter dispensing device comprises a cylinder 15 which rotates on a shaft 16 which is connected to drive sprocket 13. The surface of cylinder 15 comprises a continuous plurality of particulate receiving containers 17. A restrainer 18 extends the entire length of the cylinder 15 and is immediately adjacent thereto.

Referring now more particularly to FIG. 3, the container 10 is shown filled with particulate material 19. The cylinder 15 is shown mounted on shaft 16. Extending around the entire surface in a continuous winding in abutting relationship is sprocket chain 20 fastened securely to the cylinder 15 at each end. Restrainer 18 is connected to container 10 by hinge 21. A lower restrainer 22 is also provided to prevent any particulate matter from entering shaft 11 under cylinder 15.

Referring now more particularly to FIG. 4, the cylinder 15 is shown provided with shaft 16. Wrapped continuously around cylinder 15 is sprocket chain 20 which is affixed at one end 23 to the cylinder 15 by appropriate means. The other end is also affixed to the opposite end of the cylinder. For purposes of illustration, the chain 20 is shown only partially wrapped around the cylinder 15. However, in use it would cover the entire surface of the cylinder. The chain 20 is wrapped so that there is an edge abutting relationship continuously throughout its length and thus there are formed a plurality of particulate receiving containers 17, which have as a bottom the surface of the cylinder 15, sides comprising the chain links 24 and ends formed by the connecting pins 25 of the sprocket chain 20. Referring to FIG. 3, it will be noted that the cylinder is designed to be rotated in a clockwise direction.

In operation, the container 10 is filled with particulate matter 19 which is prevented from going down the shaft 11 by the restrainers 18 and 22. The weight of the particulate matter causes it continuously to press against the surface of the wrapped sprocket chain 20. As the cylinder 15 is rotated in a clockwise direction by the rotation of the shaft 16, the particulate matter falls into the particulate receiving containers 17, formed by the portions of the chain 24, 25 and the surface of the cylinder 15. The amount of particulate matter in the containers 17 is controlled by the movement of the rotating cylinder 15 against the restrainer 18, which performs the dual function of preventing the particulate matter from dropping down the shaft 11 by gravity and also skims off any excess particulate matter that would otherwise be carried in the individual containers 17. The result is that a uniform quantity of particulate matter is continuously dispensed through the shaft 11 the entire length of the device. This is accomplished at a minimum expense.

While this invention has been described in its preferred embodiment, it is appreciated that variations thereon may be made without departing from the proper scope and spirit of the invention.

What is claimed is:

1. A particulate matter dispensing device comprising container means, rotatable cylindrical means disposed horizontally in said container means, means for rotating said cylindrical means, a plurality of particulate receiving container means covering substantially the entire surface of said cylindrical means, a single length of sprocket chain, helically wound about said cylindrical means in abutting relationship wherein said sprocket chain is fastened at each of its ends to longitudinally opposite ends of said cylindrical means and covers substantially all of the surface of said cylindrical means, said sprocket chain comprising a single chain comprising two spaced substantially parallel sides, said sides being connected at spaced intervals by connecting pin means, so as to create said plurality of particulate receiving means, and restrainer means positioned coextensive with said cylindrical means and extending throughout the length of said cylindrical means.

2. A device as set forth in claim 1 wherein said sprocket chain sides comprise a plurality of pieces rotatably connected to said connecting pin means.

3. A device as set forth in claim 2 wherein said restrainer means comprises a flat, thin sheet material which has one edge connected to the interior of said container means and extends over and rests on said plurality of particulate receiving container means.

4. A device as set forth in claim 3 wherein an additional restrainer means is provided below said cylindrical means and extends co-extensive therewith throughout the entire length of said cylindrical means.

* * * * *